Figure 1:
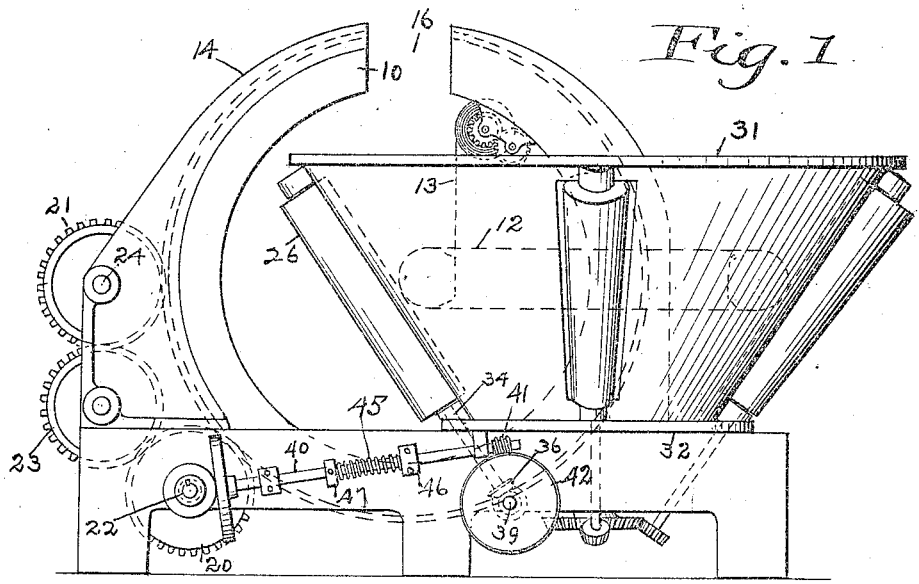

P. E. WELTON.
MACHINE FOR WRAPPING ANNULI.
APPLICATION FILED AUG. 25, 1913.

1,140,729.

Patented May 25, 1915.
2 SHEETS—SHEET 1.

Witnesses
E. B. Gilchrist
L. I. Porter

Inventor
Park E. Welton
by Thurston & Kwis
Attorneys

P. E. WELTON.
MACHINE FOR WRAPPING ANNULI.
APPLICATION FILED AUG. 25, 1913.
1,140,729.
Patented May 25, 1915.
2 SHEETS—SHEET 2.
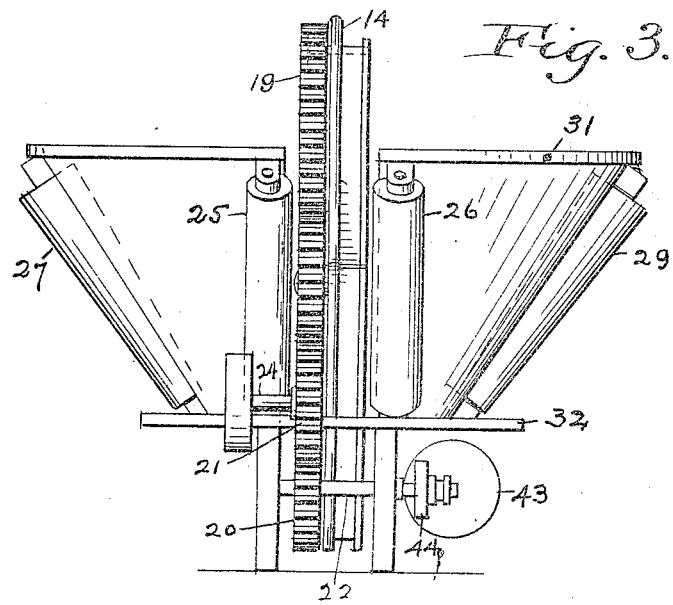
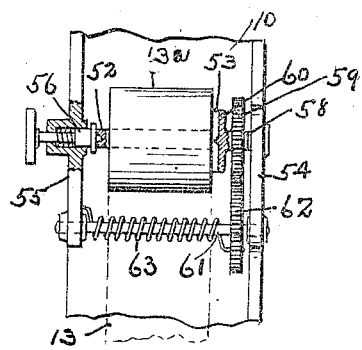
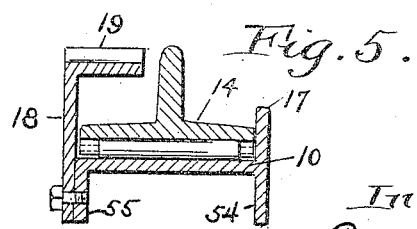
Witnesses
E. B. Gilchrist
L. I. Porter
Inventor
Park E. Welton
by Thurston & Kwis
attorneys

UNITED STATES PATENT OFFICE.

PARK E. WELTON, OF AKRON, OHIO.

MACHINE FOR WRAPPING ANNULI.

1,140,729.　　　　Specification of Letters Patent.　　Patented May 25, 1915.

Application filed August 25, 1913.　Serial No. 736,430.

*To all whom it may concern:*

Be it known that I, PARK E. WELTON, a citizen of the United States, residing at Akron, in the county of Summit and State of Ohio, have invented a certain new and useful Improvement in Machines for Wrapping Annuli, of which the following is a full, clear, and exact description.

This invention is an improved machine adapted to wrap paper, tape or other fabric spirally around an annulus.

The machine in which the invention is embodied is contrived with special reference to its use in wrapping strips of paper or cloth around pneumatic tires and tire casings, irrespective of their size,—and of doing this quickly and neatly.

The invention consists in the construction and combinations of parts shown in the drawing and hereinafter described and pointed out definitely in the appended claims.

Figure 2:
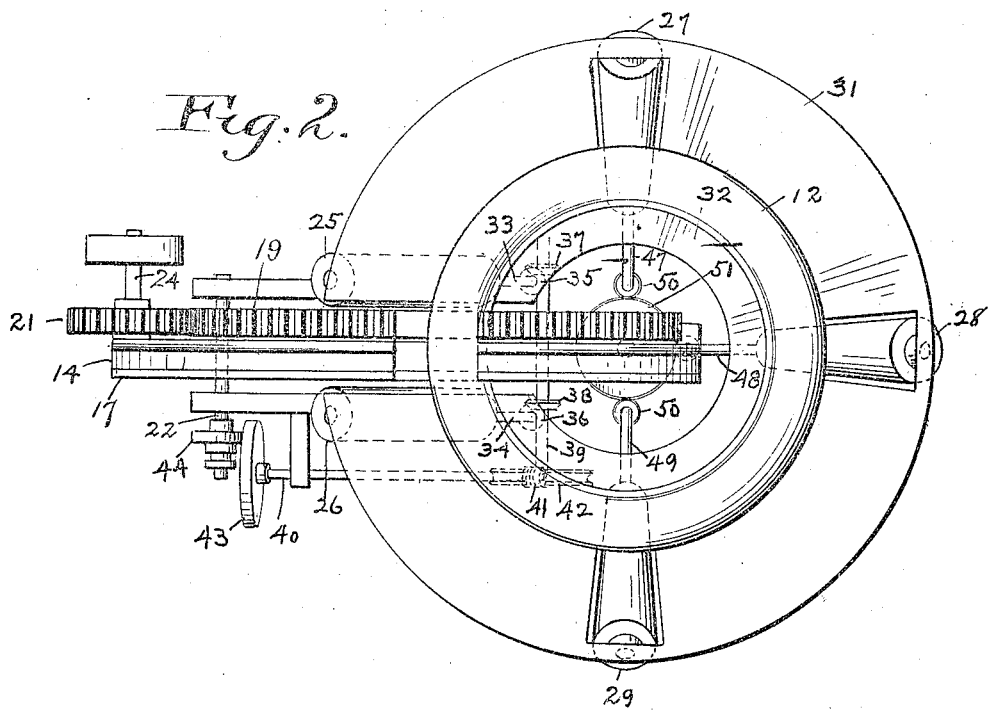

In the drawing, Figure 1 is a side elevation of a machine which embodies the invention; Fig. 2 is a plan view thereof; Fig. 3 is an end elevation; Fig. 4 is a view of the tension take-up device carried by the shuttle when viewed in the direction of the arrow adjacent to Fig. 1; Fig. 5 is a sectional view on the plane indicated by the line 5—5 on Fig. 1.

Referring to the parts by reference characters, 10 represents the annular shuttle whose function is to carry repeatedly around the tire 12, the strip 13 which is to be wound thereon. This shuttle is mutilated in the sense that it is not a complete ring. A portion of the ring is cut away, leaving an opening, as at 16 in Fig. 1, which is of sufficient width to permit the passing through it of one side of any tire which the machine is capable of wrapping. This shuttle is rotatively mounted in a mutilated circular guide member 14, so that the axis of the shuttle is horizontal, and so that the shuttle therefore rotates in a vertical plane. This frame member is mutilated in the same sense that the rota is; that is to say, a short section of its upper part is omitted, so that there will be an opening 16 through it sufficiently wide for the passage of a tire to be wrapped.

In the construction shown, the shuttle is inside the guide member, and it is held therein by a flange 17, which lies against one side of the guide member, and a flange 18 which is removably secured to the shuttle so as to lie against the other side of the guide member. This removable flange 18 is formed with peripheral gear teeth 19, as shown.

Two driving gears 20, 21, mounted on the frame of the machine, engage with gear 19, and they are placed at such distance apart that when the cutaway part of the gear 19 is adjacent to one of these driving gears, the other driving gear will engage with gear 19 and therefore continue to turn the shuttle. The gear 20 may be mounted on a shaft 22; and an intermediate gear 23 may transmit motion to it from the gear 21 which may be fixed to the driving shaft 24.

The tire 12 while being wrapped is supported in a horizontal plane, which intersects the vertical plane in which the shuttle turns, by resting upon five rolls 25, 26, 27, 28 and 29. These rolls are all inclined, being farther apart at their upper ends. Their upper ends are mounted in a mutilated annular frame member 31; and their lower ends are mounted in the mutilated annular frame member 32. These two frame members are mutilated in the sense that a portion of each, lying within the circle of the shuttle, and its supporting guide member, is cut away or omitted, leaving a recess between the ends of each guide member, which recess is in the vertical plane in which the shuttle turns.

The two rolls 25 and 26 are the driving rolls and they are preferably of cylindrical form. They are respectively secured to the shafts 33, 34 which project down through the lower frame member 32, and they carry on their lower ends respectively, the bevel gears 35, 36, which mesh with bevel gears 37, 38 on a shaft 39. This latter shaft is driven slowly from a worm shaft 40 carrying a worm 41 which engages a worm wheel 42 on the shaft 39. This worm shaft 40 is driven from shaft 24 by a friction drive which comprises a disk 43 fixed to shaft 40, and a disk 44 fixed to shaft 24, the periphery of the latter disk engaging the face of disk 43. The disk 44 has a sliding tongue and groove connection with its shaft 24 so that by sliding this disk along said shaft, the worm shaft 40 may be turned at different rates relatively to the rate at which the shuttle is turned. A spring 45 which embraces the worm shaft 40, thrusts against one of its bearings 46, and a collar 47 on the worm shaft, and thereby maintains the engagement of the two friction disks 43, 44.

The rolls 27, 28 and 29 are slightly conical, and they are mounted with their large ends up, and are so disposed that their axes converge downwardly to a common point. The taper of these rolls is such, and the driving rolls are set at such inclination that longitudinal lines on the surface of all of the five rolls, passing through the tangential points at which the supported tire will touch said rolls, will all converge downward to a common point. These conical rolls are connected respectively with shafts 47, 48 and 49 which extend down through the frame member 32, and each has a bevel gear 50 fixed to its lower end. The three bevel gears 50 mesh with an idler bevel gear 51. It therefore follows that when any one of these three conical rolls is turned, the other two must also turn and at the same rate.

The wrapping strip 13 of paper or cloth which is to be wound upon a tire is formed into a roll 13ª which is placed upon and connected with a mandrel 52, on which is a friction disk 53. In one of the inwardly extended side flanges 54 of the shuttle is mounted a shaft 58 on which is a gear 59 and a friction disk 60. In the opposite inwardly projecting flange 55 of the shuttle is mounted a spring plunger 56. The mandrel 52 carrying the roll 13ª is centered between this spring plunger and the shaft 58 so that the two friction disks 53 and 60 shall be pressed into contact by the action of the spring plunger, and shall act as a friction clutch for connecting shaft 58 and mandrel 50. Another parallel shaft 61 is mounted in the rota flanges 54 and 55, and has a gear 62 which meshes with gear 59. A spring 63, around shaft 61 is connected at its ends with said shaft and the rota respectively.

The described parts associated with the roll 13ª constitute an effective tension take-up which will keep the strip 13 taut as it is being wound upon a tire.

In operating with the above described machine, a tire of any size is put into the machine, passing one side of the tire through the opening in the shuttle and its supporting guide member 14. The tire will come to rest in approximately horizontal position in contact with the inclined rolls 25, 26, 27, 28, and 29, or some of them. When the tire has been so placed, it will surround one side of the shuttle and likewise one side of the tire will be surrounded by the shuttle. The end of the paper or fabric strip 13 will be drawn from the roll and made fast to the tire and the machine set in operation. As the shuttle turns, it will wind this wrapping strip upon the tire. As the strip is drawn from the roll, the roll will be turned in the unwinding direction. The friction between the clutching surfaces on the two disks 53 and 60 will cause the shaft 58 to turn. This through the gears 59 and 62 will cause shaft 61 to turn, and thereby wind up the spring 63. This continues until the resistance of said spring exceeds the frictional resistance between the two clutching surfaces on the engaging disks; after which the roll and its member will turn independently of shaft 58,—the clutch surface which turns with the roll, slipping on the clutch surface carried by the shaft. If, however, there is any slackening in the pull on the strip, the tension spring 63 will through the described mechanism, turn the roll backward and take up this slack. The spring and friction clutch coacting in the manner stated, insures that the strip shall always be wrapped tightly upon the annulus; and inasmuch as the annulus is being slowly turned in a horizontal plane, this wrapping will take the spiral form.

The turning of the annulus or tire at the required rate will be caused by the engagement therewith of the rotating feed rolls 25, 26. As the tire turns, it will by its contact with one or more of the rolls 27, 28, and 29, turn that roll or rolls. Whether it contacts with one or more of said conical rolls, all three of said rolls will necessarily turn at the same rate. If therefore, the tire has not been placed in a true horizontal position, it will strike these conical rolls at different elevations, and therefore at points where they differ in diameter. In order that the tire shall turn in contact with these conical rolls, all turning at the same rate, it is essential that the tire shall contact with said rolls at points where the rolls are of like diameter; or otherwise, one or more rolls must slip against the tire. The friction between the tire and the rolls is so great, that instead of permitting this slipping, the rolls act automatically to bring the tire into the horizontal position in which it does strike the conical rolls at points where they are of like diameter. This action takes place regardless of the diameter of the tire. As the shuttle turns the winding strip 13 upon the tire, this strip will pass between the driving rolls 25, 26, and through the adjacent openings in the frame members 31, 32.

Having thus described my invention, what I claim is:

1. In a machine for wrapping annuli, the combination of a mutilated annular shuttle, a mutilated circular guide member lying in a vertical plane and rotatably supporting said shuttle, a plurality of inclined rolls for supporting the annulus to be wrapped, which rolls are arranged with their axes converging downward toward a common point, means for slowly turning the annulus which said rolls support about a vertical axis, means for supporting a roll of the wrapping strip upon the shuttle, and a tension take-up device acting to turn said roll in the direction to wind the wrapping strip upon said roll.

2. In a machine for wrapping annuli, the combination of a mutilated annular shuttle, a mutilated circular guide member lying in a vertical plane and supporting the shuttle, and guiding it to rotate about a horizontal axis, an inclined driving roll for the annulus to be wrapped, and a plurality of inclined conical annulus supporting rolls which are set with their small ends down, all of said conical rolls being set at such inclinations that their axes converge downward to a common point, means for turning the feed roll, mechanical connections between the several conical rolls which compel them all to turn at the same rate when either is turned, means for supporting a roll of the wrapping strip upon the shuttle, and a tension take-up device coacting with said roll.

3. In a machine for wrapping annuli, the combination of a mutilated annular shuttle, a mutilated circular guide member standing in a vertical plane and supporting the shuttle in such manner that its axis is horizontal, two frame members lying in horizontal planes which intersect the plane in which the shuttle stands, each of said frame members being cut away at points within the circle of the shuttle and in the vertical plane at which it turns, two inclined feed rolls mounted in said horizontal frame members and lying on opposite sides of the plane in which the shuttle turns, means for turning said feed rolls, a plurality of inclined conical annulus supporting rolls mounted in said horizontal frame members, said conical rolls being set at such inclinations that their axes converge downward toward a common point, means compelling the conical rolls to turn in unison and at the same rate, means for supporting a roll of the wrapping strip upon the shuttle, and a tension take-up device coöperating with said roll.

4. In a machine for wrapping annuli, and as a means for supporting and slowly turning the annulus to be wrapped in a horizontal plane, the combination of an inclined feed roll, a plurality of inclined conical rolls arranged with their large ends outermost, the inclination of said conical rolls being such that they converge downward toward a common point, means compelling the conical rolls to turn in unison and at the same rate, and driving mechanism for said feed roll.

5. In a machine for wrapping annuli, and as a means for supporting and slowly turning the annulus to be wrapped in a horizontal plane, the combination of inclined feed rolls, a plurality of inclined conical rolls arranged with their large ends outermost, the taper and inclination of the conical rolls and the inclination of the feed rolls being such that longitudinal lines on their surfaces which intersect the points at which various sized tires will touch said surfaces, will all converge toward a common point, and means compelling said conical rolls to rotate in unison and at the same rate when either roll is turned.

In testimony whereof, I hereunto affix my signature in the presence of two witnesses.

PARK E. WELTON.

Witnesses:
L. I. PORTER,
A. J. HUDSON.